US010653068B2

(12) United States Patent
Kemmerer

(10) Patent No.: US 10,653,068 B2
(45) Date of Patent: May 19, 2020

(54) ADJUSTMENT AND SUSPENSION DEVICE FOR CONCAVES

(71) Applicant: CNH Industrial America LLC, New Holland, PA (US)

(72) Inventor: Benjamin Kemmerer, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 276 days.

(21) Appl. No.: 15/901,562

(22) Filed: Feb. 21, 2018

(65) Prior Publication Data

US 2019/0254233 A1    Aug. 22, 2019

(51) Int. Cl.
*A01F 12/28*    (2006.01)

(52) U.S. Cl.
CPC .................... *A01F 12/28* (2013.01)

(58) Field of Classification Search
CPC ......... A01F 12/28; A01F 12/181; A01F 12/26
See application file for complete search history.

(56) References Cited

U.S. PATENT DOCUMENTS

| 132,017 | A | * | 10/1872 | Miller | ............... | A01F 11/06 |
| | | | | | | 460/46 |
| 3,974,837 | A | * | 8/1976 | Applegate | ............... | A01F 12/28 |
| | | | | | | 460/105 |
| 6,358,142 | B1 | * | 3/2002 | Imel | .............. | A01F 12/26 |
| | | | | | | 460/107 |
| 7,252,587 | B2 | | 8/2007 | Viaud | | |
| 7,803,040 | B1 | * | 9/2010 | Flickinger | ............... | A01F 12/28 |
| | | | | | | 460/109 |
| 2006/0019731 | A1 | * | 1/2006 | Ricketts | ............... | A01F 12/26 |
| | | | | | | 460/108 |
| 2010/0267433 | A1 | | 10/2010 | Flickinger et al. | | |

(Continued)

FOREIGN PATENT DOCUMENTS

| DE | 103 53 385 A1 | 6/2005 |
| EP | 3178309 A1 | 6/2017 |
| FR | 2 643 216 A1 | 8/1990 |

(Continued)

OTHER PUBLICATIONS

Extended European Search Report for EP Application No. 19158181.8 dated Jun. 28, 2019 (five pages).

*Primary Examiner* — Robert E Pezzuto
*Assistant Examiner* — Adam J Behrens
(74) *Attorney, Agent, or Firm* — Peter Zacharias; Patrick Sheldrake

(57) ABSTRACT

An agricultural vehicle including a chassis and a threshing system supported by the chassis. The threshing system includes a rotor, a housing surrounding at least a portion of the rotor and including at least one concave, and a concave adjustment and suspension device connected to the housing and configured for adjusting a position of the concave frame and relieving an impact force acting on the at least one concave. The concave adjustment and suspension device includes a torsion bar, a drive operably coupled to the main section of the torsion bar and configured for rotating the torsion bar to adjust the position of the concave frame, and at least one pneumatic spring mounted to the torsion bar and configured for compressing to relieve the impact force acting on the at least one concave.

17 Claims, 3 Drawing Sheets

(56) References Cited

U.S. PATENT DOCUMENTS

2017/0164560 A1* 6/2017 Van Hullebusch .... A01D 41/12

FOREIGN PATENT DOCUMENTS

| WO | 2011/073750 A1 | 6/2011 | | |
|----|----|----|----|----|
| WO | 2013/082236 A1 | 6/2013 | | |
| WO | WO-2013082236 A1 * | 6/2013 | ............. | A01F 12/28 |
| WO | WO-2014191804 A1 * | 12/2014 | ............. | A01F 12/28 |
| WO | 2016/055364 A1 | 4/2016 | | |

* cited by examiner

ADJUSTMENT AND SUSPENSION DEVICE FOR CONCAVES

FIELD OF THE INVENTION

The present invention relates to agricultural harvesters, and, more particularly, to agricultural harvesters with concaves.

BACKGROUND OF THE INVENTION

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a housing, which may include adjustable concaves and performs a threshing operation on the crop material to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge chaff and other debris toward the rear of the combine. Material other than grain (MOG), such as straw, debris, dust, etc., from the threshing section proceeds through a residue system, which may utilize a straw chopper to process the MOG and direct it out through the rear of the combine.

Generally, concaves may be adjustably mounted on one or both sides of the concave frame. Thereby, the distance, e.g. the clearance passageway for crop material to flow therein, between the concaves and the rotor may be adjusted. In order to adjust the clearance passageway, there exists various concave adjustment assemblies or mechanisms which allow concave adjustments to be made by the combine operator. Such adjust assemblies or mechanisms typically include a motor in driven relation to a gear train in connection with the concaves for moving the concaves radially inward or outward from the rotor.

However, some concave adjustment systems may lead to a decrease in the operational life of the threshing and separating system as well as to operator discomfort. Some concave adjustment systems are inflexibly mounted relative to the concaves and thereby may receive unwanted threshing forces, generated by the rotation of the rotor and/or resulting impar s on the concaves from the crop material during threshing, which can lead to damage of the concaves and breakage or failure of the concave adjustment system. For example, when a wad of crop material, especially damp crop material, enters the threshing chamber, the rotor may lag or become sluggish due to an inflexible and relatively unresponsive concave adjustment system that may not readily adjust the clearance passage between the rotor and the concaves. Additionally, for example, certain crop materials and field conditions, such as when harvesting a crop material in a field with green weeds, the rotor may tend to rumble, which can lead to damaging the threshing components as well as to operator discomfort during the time periods when the rotor is rumbling. Because some concave adjustment systems provide poor flexibility in the relationship between the rotor and the concaves, the excessive rumbling of the rotor is not alleviated. Further, with some concave adjustment systems which do not readily respond to impulsive force impacts, such as rocks contacting the concaves, impact damage on the raspbars, the mounts, or the rotor itself may still persist. In sum, some adjustably mounted concaves can lead to shortened operational life, costly repairs, and operator discomfort.

What is needed in the art is a cost-effective and responsive concave adjustment device.

SUMMARY OF THE INVENTION

In one exemplary embodiment formed in accordance with the present invention, there is provided a concave adjustment and suspension device which includes a torsion bar with a main section and a pair of additional sections and a pair of pneumatic springs which are interconnected between the main section and a respective additional section. The pneumatic springs translate the rotation of the main section to the additional sections to adjust the position of the concave and compress to provide a responsive suspension to relieve impact forces acting on the concave.

In another exemplary embodiment formed in accordance with the present invention, there is provided an agricultural vehicle including a chassis and a threshing system supported by the chassis. The threshing system includes a rotor, a housing surrounding at least a portion of the rotor and including at least one concave located at a distance radially away from the rotor and having a concave frame which is configured for receiving a concave insert, and a concave adjustment and suspension device connected to the housing and configured for adjusting a position of the concave frame and relieving an impact force acting on the at least one concave. The concave adjustment and suspension device includes a torsion bar having a main section and at least one additional section which is rotatably connected to the main section and operably coupled to the concave frame, a drive operably coupled to the main section of the torsion bar and configured for rotating the torsion bar to adjust the position of the concave frame, and at least one pneumatic spring mounted to the torsion bar and configured for compressing to relieve the impact force acting on the at least one concave.

In another exemplary embodiment formed in accordance with the present invention, there is provided a threshing system for threshing a crop material. The threshing system includes a rotor, a housing surrounding at least a portion of the rotor and including at least one concave located at a distance radially away from the rotor and having a concave frame which is configured for receiving a concave insert, and a concave adjustment and suspension device connected to the housing and configured for adjusting a position of the concave frame and relieving an impact force acting on said at least one concave. The concave adjustment and suspension device includes a torsion bar having a main section and at least one additional section which is rotatably connected to the main section and operably coupled to the concave frame, a drive operably coupled to the main section of the torsion bar and configured for rotating the torsion bar to adjust the position of the concave frame, and at least one pneumatic spring mounted to the torsion bar and configured for compressing to relieve the impact force acting on the at least one concave.

In yet another exemplary embodiment formed in accordance with the present invention, there is provided a method of operating an agricultural vehicle, including the step of providing a threshing system for threshing a crop material. The threshing system includes a rotor, a housing surrounding at least a portion of the rotor and including at least one concave located at a distance radially away from the rotor and having a concave frame which is configured for receiving a concave insert, and a concave adjustment and suspension device connected to the housing and configured for adjusting a position of the concave frame and relieving an impact force acting on said at least one concave. The concave adjustment and suspension device includes a torsion bar having a main section and at least one additional section which is rotatably connected to the main section and operably coupled to the concave frame. The at least one additional section is independently rotatable from the main section. The concave adjustment and suspension device further includes a drive operably coupled to the main section of the torsion bar, and at least one pneumatic spring interconnected between the main section and the at least one additional section. The method also includes the steps of rotating the torsion bar by the drive, translating, by said at least one pneumatic spring, a rotation of the main section to rotate the at least one additional section in order to adjust the position of the concave frame, and compressing the at least one pneumatic spring to relieve the impact force acting on the at least one concave.

One possible advantage of the exemplary embodiment of the concave adjustment and suspension device is that the operational life of the threshing system may be extended because the pneumatic springs of the concave adjustment and suspension device can simultaneously translate rotational forces of the torsion bar to adjust the radial distance between the rotor and the concave and compress to provide adequate suspension to the concave.

Another possible advantage of the exemplary embodiment of the concave adjustment and suspension device is that damage to the concave may be avoided due to the responsive suspension provided by the pneumatic springs.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience, but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
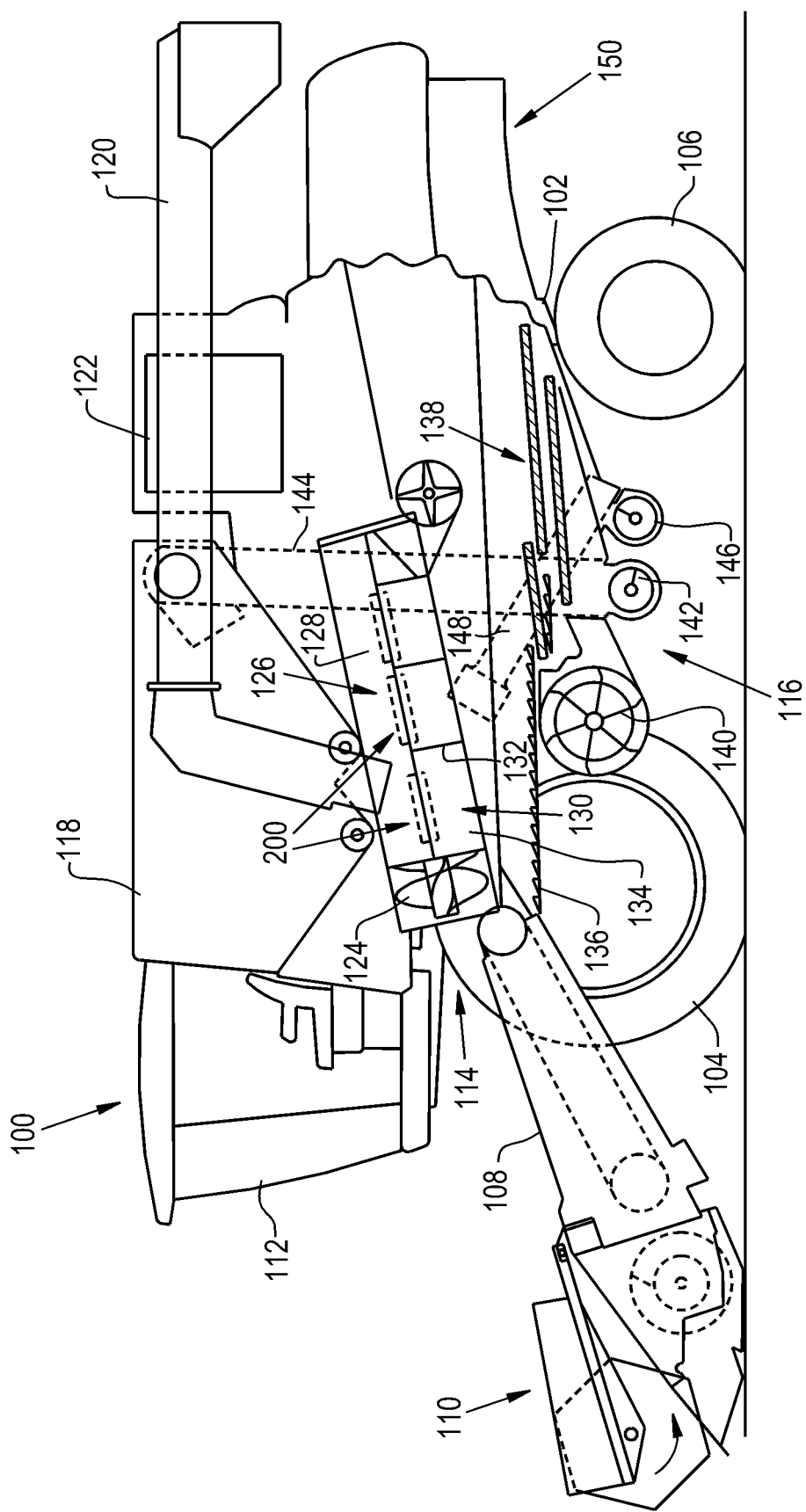
FIG. 1 illustrates a side view of an exemplary embodiment of an agricultural vehicle, the agricultural vehicle including a concave adjustment and suspension device, in accordance with an exemplary embodiment of the present invention.

Referring now to the drawings, and more particularly to FIG. 1, there is shown an agricultural harvester in the form of a combine 100, which generally includes a chassis 102, ground engaging wheels 104 and 106, a feeder housing 108, a header 110 connected to the feeder housing 108, an operator cab 112, a threshing system 114, a cleaning system 116, a grain tank 118, and an unloading auger 120. Motive force is selectively applied to the front wheels 104 through a prime mover in the form of a diesel engine 122 and a transmission (not shown).

The threshing system 114 is of the axial-flow type, and generally includes a rotor 124, which is rotatable about a longitudinal axis thereof and is at least partially enclosed by and rotatable within a corresponding, cylindrical tube or housing 126. The housing 126 surrounds at least a portion of the rotor 124 and generally includes an upper hemisphere in the form of a rotor shield 128 and a lower hemisphere in the form of one or more concave(s) 130 located at a distance radially away from the rotor 124. In this regard, a gap, e.g. a clearance passage, exists between the rotor 124 and the concave(s) 130 which allows crop material to be threshed therein. As the crop material enters the clearance passage, it may be helically conveyed from the front to the rear of the housing 126 via the motion of the rotor 124. Each concave 130 has a concave frame 132 which is configured for receiving and supporting a concave insert 134. Each concave 130 may include a plurality of perforations, apertures, or orifices therethrough for allowing the passage of correspondingly-sized crop material, such as threshed grain and small particles of MOG. The concave(s) 130 may be hingedly and/or rigidly supported relative to rotor shield 128. For example, the concave(s) 130 may be flexibly mounted at the right side of the concave frame(s) 132 and may be rigidly mounted at the left side of the concave frame(s) 130. As discussed below, the concave(s) 130 may be adjusted in order to alter the clearance passage between the rotor 124 and the concave(s) 130.

The cleaning system 116 generally includes a grain pan 136, one or more sieve(s) 138, and a cleaning fan 140. In operation, the cut crop material which has been threshed and separated by threshing system 114 falls onto the grain pan 136 and the sieve(s) 138. The grain pan 136 and the sieve(s) 138 may oscillate in a fore-to-aft manner in order to further sift the crop material. The cleaning fan 140 provides an airflow through the sieve(s) 138 to remove chaff and other impurities such as dust from the grain via making this material airborne for discharge out of the rear of the combine. After passing through the cleaning system 116, the clean grain falls to a clean grain auger 142 positioned crosswise below and in front of the sieve(s) 138. The clean grain auger 142 conveys the clean grain laterally to a generally vertically arranged grain elevator 144 for transport to the grain tank 118. Tailings from the cleaning system 116 are transported via a tailings auger 146 and a return auger 148 to the upstream end of the cleaning system 116 for repeated cleaning action. The non-grain crop material proceeds out of the rear of the combine 100 through a residue handling system 150, which may include a chopper, counter knives, a windrow door, and a residue spreader.

Figure 2:
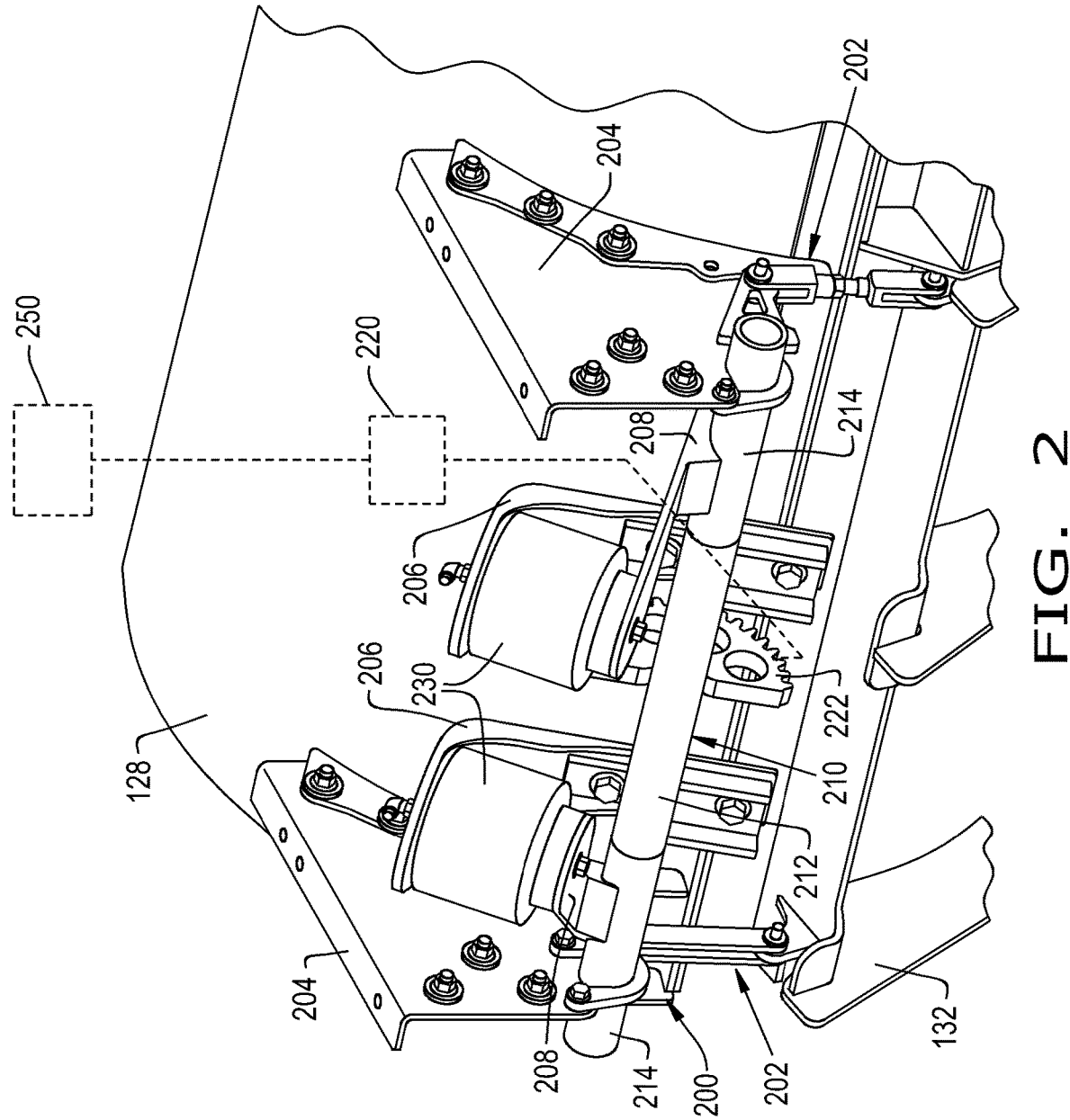
FIG. 2 illustrates a perspective view of the concave adjustment and suspension device of FIG. 1, in accordance with an exemplary embodiment of the present invention.
Figure 3:
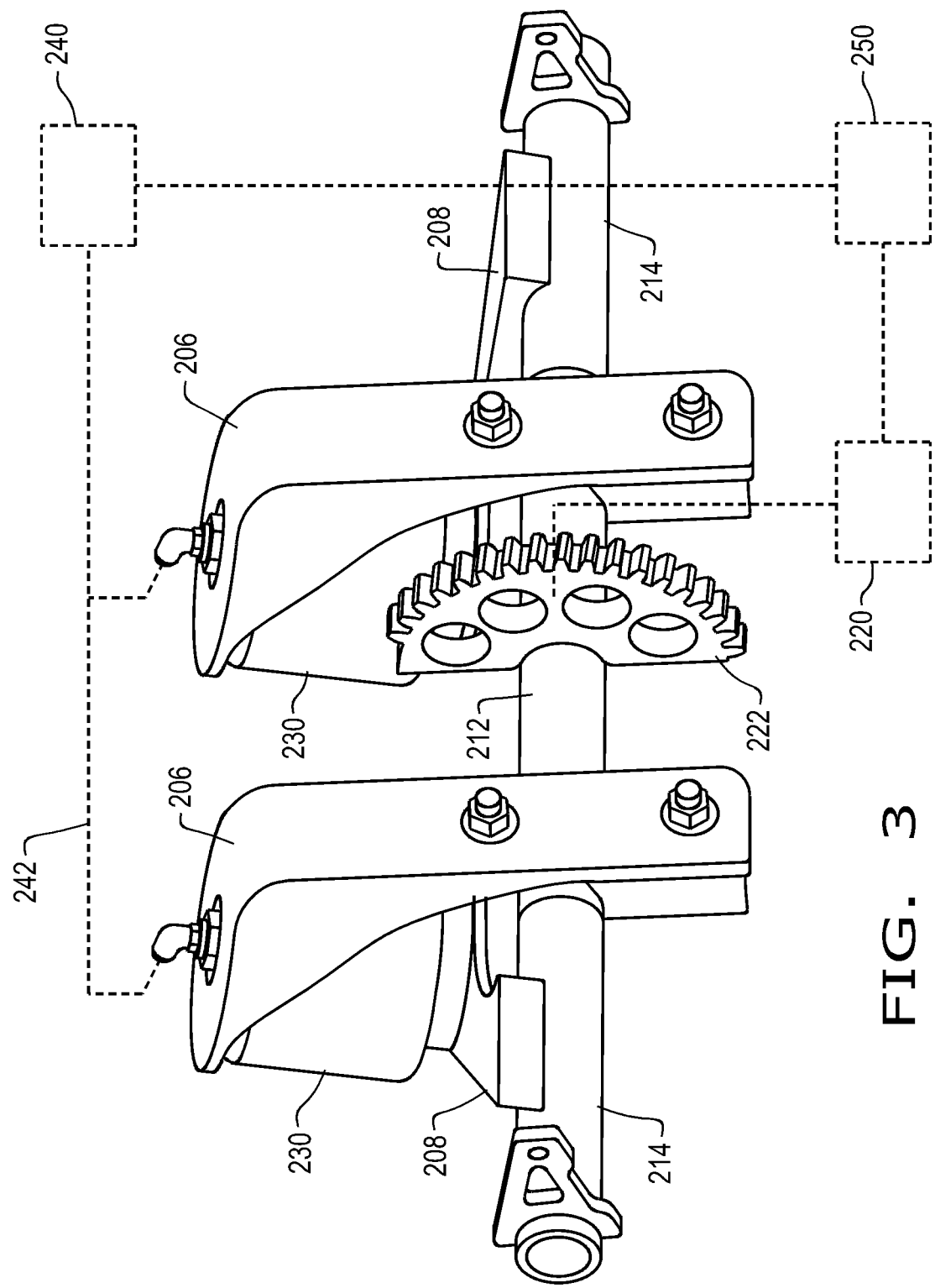
FIG. 3 illustrates another perspective view of the concave adjustment and suspension device of FIG. 1, in accordance with an exemplary embodiment of the present invention.

Referring now collectively to FIGS. 1-3, there is shown a concave adjustment and suspension device 200 connected to the housing 126. The concave adjustment and suspension device 200 generally includes a torsion bar 210, a drive 220, and one or more pneumatic spring(s) 230. The concave adjustment and suspension device 200 may adjust a position of the concave frame 132 and relieve an impact force acting on the concave(s) 130. For example, if the clearance passage receives large masses of crop material, rocks, and other hard objects, which generate impact forces on the concave 130, the concave adjustment and suspension device 200 may adjust the clearance passage between the rotor 124 and the concave(s) 130 in order to relieve impact pressure experienced by the concave 130. It should be appreciated that the combine 100 may include one or more than one concave adjustment and suspension device(s) 200. Additionally, the combine 100 may include more than one concave adjustment and suspension device 200 associated with each concave 130. For instance, it is conceivable to include a left and right concave adjustment and suspension device 200 for the left and ride sides of the concave frame 132 (not shown). In this regard, the concave frame 132 would be flexibly mounted at both of its left and right sides.

The torsion bar 210 has a main section 212 and one or more additional section(s) 214. The main section 212 is operably coupled to the drive 220. As shown, the torsion bar 210 has a pair of additional sections 214. The additional sections 214 are rotatably connected to the main section 212 such that the sections 212, 214 are sleeved into one another and may rotate independently of one another. The additional sections 214 are also operably coupled to the concave frame 132 via one or more linkage(s) 202 and to the rotor cage 128 of the housing 126 via housing mounting brackets 204. The linkage(s) 202 operably connect each additional section 214 with a respective front and rear portion of the concave frame 132. The torsion bar 210 may be composed of any desired metal, such as steel.

The drive 220 is operably coupled to the main section 212 of the torsion bar 210. The drive 220 rotates the torsion bar 210 to adjust the position of the concave frame 132. The drive 220 may be in the form of any desired drive such as the drive disclosed in U.S. Pat. No. 7,803,040, owned by CNH America, LLC. Thereby, for example, the drive 220 may include a first gear 222 affixed to the main section 212 of the torsion bar 210, a corresponding second gear that meshes with the first gear 222, and a motor operably coupled to the second gear (not shown). The drive 220 may be fixedly supported, in cantilever relation, to the rotor cage 128 of the housing 126 or the drive 220 may be mounted to another structure of the combine 100. It should be appreciated that the concave adjustment and suspension device 200 may include one or more drives 220 to rotate a respective torsion bar 210.

The pneumatic spring(s) 230 may be mounted to the torsion bar 210. As shown, there are two pneumatic spring(s) 230; however, it should be appreciated that there may be one or more than two pneumatic springs 230 attached to the torsion bar 210. The pneumatic springs 230 may translate a rotation of the main section 212 to rotate the additional sections 214 in order to adjust the position of the concave frame 132, and the pneumatic springs 230 may compress to relieve the impact pressure acting on the concave 130 due to impact forces from an object or a large amount of crop material. In more detail, each pneumatic spring 230 is interconnected to the main section 212 and to a respective additional section 214 by way of a pair of first and second mounting brackets 206, 208. The first mounting brackets 206 respectively interconnect the main section 212 with the top of each pneumatic spring 230, and the second mounting brackets 208 respectively interconnect each additional section 214 with the bottom of each pneumatic spring 230. The pneumatic springs 230 are respectively associated with the front portion and the rear portion of the concave 130 such that the pneumatic springs 230 independently and respectively adjust the positions of the front portion and/or rear portion of the concave 130. In this regard, the pneumatic springs 230 can relax the front or back of the concave frame 132 while maintaining the clearance passage at the back or front of the concave frame 132.

The concave adjustment and suspension device 200 may also include an air compressor 240 and a control unit 250 (FIG. 3). The air compressor 240 may be fluidly coupled to each pneumatic spring 230 via pneumatic lines 242. The air compressor 240 may be in the form of any desired air compressor, such as an existing, onboard air compressor or a separate air compressor which specifically services the pneumatic springs 230. The control unit 250 is operably connected to each pneumatic spring 230 by way of being operably connected to the drive 220 (FIG. 2) and/or to the air compressor 240 (FIG. 3). For instance, the control unit 250 may vary the air pressure within pneumatic springs 230 to adjust the clearance passage between the concave 130 and the rotor 124, depending upon a user command and/or a crop condition, e.g. a slog experienced by the rotor 124, a wet crop material, or a crop material with numerous rocks. The control unit 250 may also change the air pressure within the pneumatic springs 230 to accommodate changes in the ambient temperature, e.g. increasing the air pressure in cold weather. It is noted that the air compressor is optional and thereby the concave adjustment and suspension device 200 may not include an air compressor.

It should be appreciated that the control unit 250 may be in the form of any desired electronic control unit (ECU), and the control unit 250 may be incorporated into existing hardware and/or software of the agricultural vehicle 100. The control unit 250 may include software code or instructions which are tangibly stored on a tangible computer readable medium. The computer readable medium may be in the form of a magnetic medium, e.g., a computer hard drive, an optical medium, e.g., an optical disc, solid-state memory, e.g., flash memory, or other storage media known in the art. Thus, any of the functionality performed by the controller 504 described herein may be implemented in software code or instructions which are tangibly stored on the tangible computer readable medium. Upon loading and executing such software code or instructions by the control unit 250, the control unit 250 may perform any of the functionality described herein.

In operation, the control unit 250 may control the drive 220 to rotate the main section 212 of the torsion bar 210 which will adjustably lift or lower the concave frame 132 to adjust the clearance passage between the concave 130 and the rotor 124. In more detail, as the main section 212 rotates, the rotational force is transmitted through the first mounting brackets 206, then through the springs 230, and then onto the second mounting brackets 208 which subsequently and respectively rotate the additional sections 214. The rotation of the additional sections 214 cause the respective linkages 202 to raise or lower the concave frame 132. The control unit 250 may also control the air compressor 240 to inflate or deflate the pneumatic springs 230. Thereby, the control unit 250 may control the initial suspension level of the pneumatic springs 230. The suspension which the pneumatic springs 230 provide to the concave frame 132, allows for quick flexibility in relieving the concaves 130 from impact forces. For instance, when crop material or an object impacts the concave inserts 134 of the concaves 130, the force of that impact will be transmitted through one or both of the linkages 202, onto the additional section(s) 214, through the second mounting bracket(s) 208, and onto the pneumatic spring(s) 230. Ultimately, the force of the impact pressure will compress one or both of the pneumatic spring(s) 230, which will temporarily open up the clearance passage in order for the crop material or the object to more easily pass through the threshing system 114. Once one or both of the pneumatic spring(s) 230 return to the normal resting position after compression, the distance between the concaves 130 and the rotor 124 will return to normal. Hence, the concave adjustment and suspension device 200 can readily adjust and provide adequate suspension for the concaves 130. Further, the pressure within the pneumatic springs 230 may be manually adjusted by an operator and/or automatically adjusted via the control unit 250 and air compressor 240. In other words, whether the concave adjustment and suspension device 200 includes or does not include an air compressor 240, an operator may manually change the pressure within the pneumatic springs 230.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
    a chassis; and
    a threshing system supported by the chassis, and including:
        a rotor;
        a housing surrounding at least a portion of the rotor and including at least one concave located at a distance radially away from the rotor and having a concave frame which is configured for receiving a concave insert; and
        a concave adjustment and suspension device connected to the housing and configured for adjusting a position of the concave frame and relieving an impact force acting on said at least one concave, said concave adjustment and suspension device including:
            a torsion bar having a main section and at least one additional section being rotatably connected to the main section and operably coupled to the concave frame;
            a drive operably coupled to the main section of the torsion bar and configured for rotating the torsion bar to adjust the position of the concave frame; and
            at least one pneumatic spring mounted to the torsion bar and configured for compressing to relieve the impact force acting on said at least one concave; and
            a first mounting bracket interconnected between said main section and a top of said at least one pneumatic spring and a second mounting bracket interconnected between said at least one additional section and a bottom of said at least one pneumatic spring.

2. The agricultural vehicle of claim 1, wherein said at least one pneumatic spring is interconnected between the main section and said at least one additional section.

3. The agricultural vehicle of claim 2, wherein said at least one additional section is independently rotatable from the main section, and said at least one pneumatic spring is further configured for translating a rotation of the main section to rotate said at least one additional section in order to adjust the position of the concave frame.

4. The agricultural vehicle of claim 1, wherein said at least one additional section of the torsion bar is in the form of a pair of additional sections rotatably coupled to a respective end of the main section of the torsion bar.

5. The agricultural vehicle of claim 4, wherein said at least one pneumatic spring is in the form of a pair of pneumatic springs, and each said pneumatic spring is interconnected between the main section and a respective additional section.

6. The agricultural vehicle of claim 5, wherein said at least one concave has a front portion and a rear portion, and said pneumatic springs are respectively associated with the front portion and the rear portion of said at least one concave such that said pneumatic springs independently and respectively adjust a position of the front portion and a position of the rear portion.

7. The agricultural vehicle of claim 1, wherein said concave adjustment and suspension device further includes an air compressor fluidly coupled to said at least one pneumatic spring.

8. The agricultural vehicle of claim 7, wherein said concave adjustment and suspension device further includes a control unit operably connected to said at least one pneumatic spring and configured for varying an air pressure within said at least one pneumatic spring to adjust the distance between said at least one concave and said rotor dependent upon at least one of a user command and a crop condition.

9. A threshing system for threshing a crop material, comprising:
    a rotor;
    a housing surrounding at least a portion of the rotor and including at least one concave located at a distance radially away from the rotor and having a concave frame which is configured for receiving a concave insert; and
    a concave adjustment and suspension device connected to the housing and configured for adjusting a position of the concave frame and relieving an impact force acting on said at least one concave, said concave adjustment and suspension device including:
        a torsion bar having a main section and at least one additional section being rotatably connected to the main section and operably coupled to the concave frame;
        a drive operably coupled to the main section of the torsion bar and configured for rotating the torsion bar to adjust the position of the concave frame; and
        at least one pneumatic spring mounted to the torsion bar and configured for compressing to relieve the impact force acting on said at least one concave; and
    a first mounting bracket interconnected between said main section and a top of said at least one pneumatic spring and a second mounting bracket interconnected between said at least one additional section and a bottom of said at least one pneumatic spring.

10. The threshing system of claim 9, wherein said at least one pneumatic spring is interconnected between the main section and said at least one additional section.

11. The threshing system of claim 10, wherein said at least one additional section is independently rotatable from the main section, and said at least one pneumatic spring is further configured for translating a rotation of the main section to rotate said at least one additional section in order to adjust the position of the concave frame.

12. The threshing system of claim 9, wherein said at least one additional section of the torsion bar is in the form of a pair of additional sections rotatably coupled to a respective end of the main section of the torsion bar.

13. The threshing system of claim 12, wherein said at least one pneumatic spring is in the form of a pair of pneumatic springs, and each said pneumatic spring is interconnected between the main section and a respective additional section.

14. The threshing system of claim 13, wherein said at least one concave has a front portion and a rear portion, and said pneumatic springs are respectively associated with the front portion and the rear portion of said at least one concave such that said pneumatic springs independently and respectively adjust a position of the front portion and a position of the rear portion.

15. The threshing system of claim 9, wherein said concave adjustment and suspension device further includes an air compressor fluidly coupled to said at least one pneumatic spring.

16. The threshing system of claim 15, wherein said concave adjustment and suspension device further includes a control unit operably connected to said at least one pneumatic spring and configured for varying an air pressure within said at least one pneumatic spring to adjust the distance between said at least one concave and said rotor dependent upon at least one of a user command and a crop condition.

17. A method of operating an agricultural vehicle, comprising the steps of:

providing a threshing system for threshing a crop material, said threshing system including a rotor, a housing surrounding at least a portion of the rotor and including at least one concave located at a distance radially away from the rotor and having a concave frame which is configured for receiving a concave insert, and a concave adjustment and suspension device connected to the housing and configured for adjusting a position of the concave frame and relieving an impact force acting on said at least one concave, said concave adjustment and suspension device including a torsion bar having a main section and at least one additional section being rotatably connected to the main section and operably coupled to the concave frame, said at least one additional section is independently rotatable from the main section, a drive operably coupled to the main section of the torsion bar, and at least one pneumatic spring interconnected between the main section and said at least one additional section;

rotating the torsion bar by said drive;

translating, by said at least one pneumatic spring, a rotation of the main section to rotate said at least one additional section in order to adjust the position of the concave frame; and compressing said at least one pneumatic spring to relieve the impact force acting on said at least one concave; and a first mounting bracket interconnected between said main section and a top of said at least one pneumatic spring and a second mounting bracket interconnected between said at least one additional section and a bottom of said at least one pneumatic spring.

* * * * *